(12) United States Patent
Shibanuma

(10) Patent No.: US 9,663,694 B2
(45) Date of Patent: *May 30, 2017

(54) COMPOSITION COMPRISING HFC AND HFO

(71) Applicant: DAIKIN INDUSTRIES, LTD., Osaka (JP)

(72) Inventor: Takashi Shibanuma, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/084,528

(22) Filed: Mar. 30, 2016

(65) Prior Publication Data

US 2016/0222267 A1 Aug. 4, 2016

Related U.S. Application Data

(63) Continuation of application No. PCT/JP2015/065823, filed on Jun. 1, 2015.

(30) Foreign Application Priority Data

Sep. 25, 2014 (JP) ................................. 2014-195670

(51) Int. Cl.
| | | |
|---|---|---|
| *C09K 5/04* | (2006.01) | |
| *C09K 3/30* | (2006.01) | |
| *C09K 3/00* | (2006.01) | |
| *C11D 7/50* | (2006.01) | |

(52) U.S. Cl.
CPC ................ *C09K 5/044* (2013.01); *C09K 3/00* (2013.01); *C09K 3/30* (2013.01); *C09K 5/04* (2013.01); *C11D 7/50* (2013.01); *C09K 2205/122* (2013.01); *C09K 2205/126* (2013.01)

(58) Field of Classification Search
CPC .......... C09K 2205/00; C09K 2205/122; C09K 2205/126; C09K 2205/22; C09K 5/04; C09K 5/041; C09K 5/044; C09K 5/045; C09K 5/048
USPC ............................................... 252/67, 68, 69
See application file for complete search history.

(56) References Cited

U.S. PATENT DOCUMENTS

| | | | |
|---|---|---|---|
| 7,371,905 B2 | 5/2008 | Basu et al. | |
| 8,147,709 B2 * | 4/2012 | Mahler | B01J 27/125 |
| | | | 252/67 |
| 8,148,317 B2 † | 4/2012 | Singh | |
| 8,333,902 B2 * | 12/2012 | Mahler | B01J 27/125 |
| | | | 252/67 |
| 2003/0157009 A1 | 8/2003 | Corr et al. | |
| 2006/0243945 A1 | 11/2006 | Minor et al. | |
| 2008/0230738 A1 † | 9/2008 | Minor | |
| 2009/0278075 A1 * | 11/2009 | Mahler | B01J 27/125 |
| | | | 252/67 |
| 2010/0029997 A1 * | 2/2010 | Wang | C07C 17/04 |
| | | | 570/134 |
| 2010/0047189 A1 † | 2/2010 | Seeton | |
| 2010/0090156 A1 † | 4/2010 | Nappa | |
| 2010/0122545 A1 † | 5/2010 | Minor | |
| 2010/0181186 A1 | 7/2010 | Uenveren et al. | |
| 2011/0012052 A1 | 1/2011 | Van Horn et al. | |
| 2011/0201851 A1 * | 8/2011 | Nose | C07C 17/087 |
| | | | 570/154 |
| 2012/0065437 A1 * | 3/2012 | Merkel | B01J 27/10 |
| | | | 570/175 |
| 2012/0165578 A1 * | 6/2012 | Mahler | B01J 27/125 |
| | | | 570/136 |
| 2012/0203037 A1 * | 8/2012 | Sharratt | C07C 17/389 |
| | | | 570/179 |
| 2013/0105724 A1 † | 5/2013 | Boussand | |
| 2013/0186115 A1 | 7/2013 | Yana Motta et al. | |
| 2015/0013942 A1 | 1/2015 | Minor et al. | |
| 2015/0322317 A1 * | 11/2015 | Collier | C09K 5/045 |
| | | | 252/67 |
| 2016/0115361 A1 * | 4/2016 | Boussand | C07C 21/18 |
| | | | 252/68 |
| 2016/0222271 A1 * | 8/2016 | Shibanuma | C09K 5/044 |
| 2016/0244651 A1 | 8/2016 | Leck et al. | |

FOREIGN PATENT DOCUMENTS

| | | | | |
|---|---|---|---|---|
| EP | 2 149 592 | | 4/2016 | |
| FR | WO 2014102479 A1 * | | 7/2014 | ............ C09K 5/045 |
| JP | 7-97587 | | 4/1995 | |
| JP | 2007-536390 | | 12/2007 | |

(Continued)

OTHER PUBLICATIONS

Extended European Search Report issued Sep. 13, 2016 in corresponding European Application No. 15196223.0.
Office Action issued Jun. 3, 2016 in corresponding U.S. Appl. No. 15/084,563.
Office Action issued Jun. 2, 2016 in corresponding U.S. Appl. No. 15/084,572.
Office Action issued Jun. 2, 2016 in corresponding U.S. Appl. No. 15/084,578.
Office Action issued May 31, 2016 in corresponding U.S. Appl. No. 15/084,587.
Kang et al., "Vapor-Liquid Equilibria for the Systems Difluoromethane + Chlorodifluoromethane, Difluoromethane + Dichlorodifluoromethane, and Difluoromethane + Chloromethane at 10.0° C.", Journal of Chemical & Engineering Data, 41:443-445 (1996).

(Continued)

*Primary Examiner* — Douglas McGinty
(74) *Attorney, Agent, or Firm* — Wenderoth, Lind & Ponack, L.L.P.

(57) ABSTRACT

The present invention provides a composition comprising a mixture of HFC and HFO and having improved lubrication performance. Specifically, the present invention provides a composition comprising HFC and HFO, wherein the composition comprises 1) at least one of HFC-134a and HFC-134 as the HFC, 2) at least one of HFO-1234yf and HFO-1234ze as the HFO, and 3) at least one member selected from the group consisting of HCFC-1122, HCFC-124, CFC-1113, and 3,3,3-trifluoropropyne as a third component.

5 Claims, 1 Drawing Sheet

(56) References Cited

FOREIGN PATENT DOCUMENTS

| | | |
|---|---|---|
| JP | 2011-520016 | 7/2011 |
| JP | 2012-510042 | 4/2012 |
| JP | 2013-544896 | 12/2013 |
| WO | 97/03936 | 2/1997 |
| WO | 2005/108523 | 11/2005 |
| WO | 2008/065331 | 6/2008 |
| WO | 2009/137656 | 11/2009 |
| WO | 2010/002014 | 1/2010 |
| WO | 2010/002020 | 1/2010 |
| WO | 2010/059677 | 5/2010 |
| WO | 2010/062888 | 6/2010 |
| WO | 2011/093521 | 8/2011 |
| WO | 2012/151238 | 11/2012 |

OTHER PUBLICATIONS

Cavestri, R. C., "Potentially Useful Polyolester Lubricant Additives: An Overview of Antioxidants, Antiwear and Antiseize Compounds" 7 pages (1996). International Refrigeration and Air Conditioning Conference. Paper 319.†

\* cited by examiner
† cited by third party

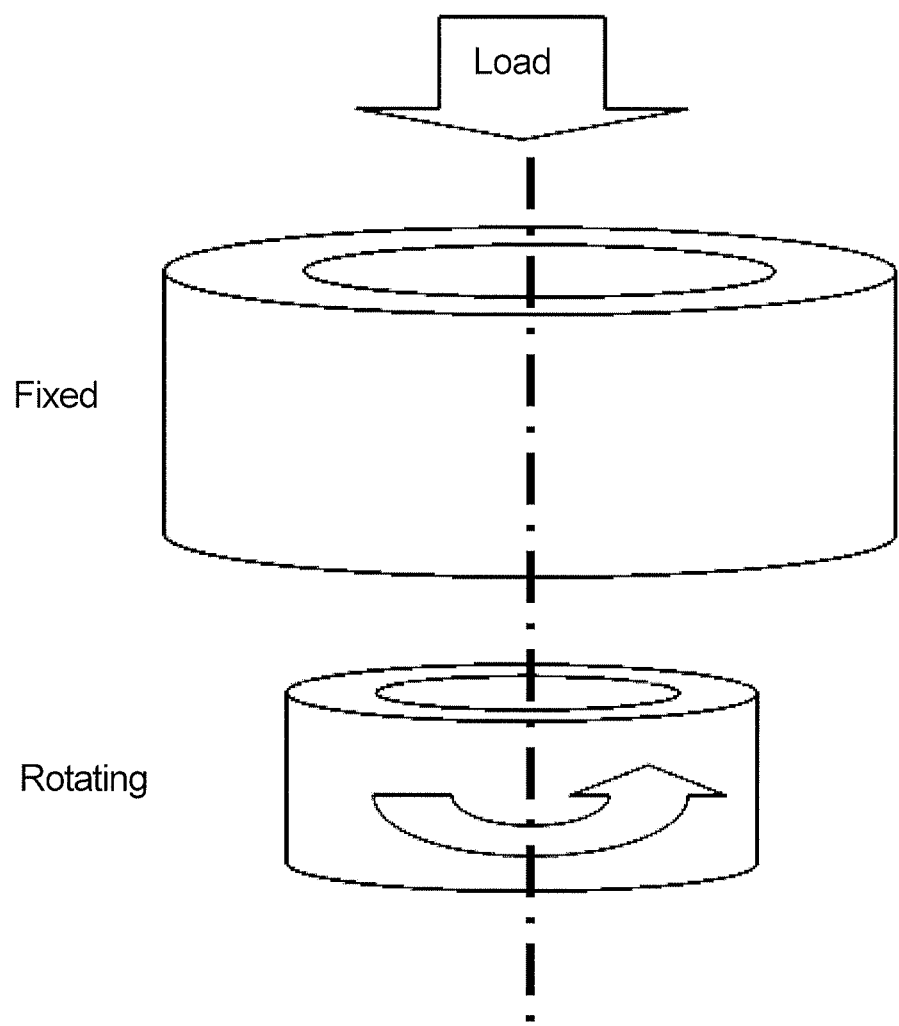

COMPOSITION COMPRISING HFC AND HFO

TECHNICAL FIELD

The present invention relates to a composition comprising HFC and HFO. HFC denotes hydrofluorocarbon, and HFO denotes hydrofluoroolefin.

BACKGROUND ART

Amid worldwide discussion about global warming as a highly serious issue, the development of environmentally preferable refrigeration and air conditioning equipment have become increasingly important. Refrigerants have an impact on warming, and are greatly involved in the performance of refrigeration and air conditioning equipment; therefore, they play an important role in techniques to reduce emissions of carbon dioxide, which affects to warming.

In recent years, there have been various proposals for partially fluorinated propene (HFO) having a double bond in the molecule, which has lower global-warming potential (GWP) than conventionally known CFC (chlorofluorocarbon), HCFC (hydrochlorofluorocarbon), and HFC.

Known examples of HFO include HFO-1234yf (2,3,3,3-tetrafluoropropene), HFO-1234ze (E- or Z-1,3,3,3-tetrafluoropropene), and the like.

These substances are used singly or in the form of a composition (mixture) for various applications. As such compositions, for example, compositions comprising a mixture of HFC and HFO are known, as described in PTL 1 to PTL 4.

PTL 1 discloses a refrigerant composition comprising 36 to 50 mass % of 1,1,1,2-tetrafluoroethane (HFC-134a) and 50 to 64 mass % of 2,3,3,3-tetrafluoropropene (HFO-1234yf).

PTL 2 discloses a refrigerant composition comprising 30 to 50 mass % of difluoromethane (HFC-32) and 70 to 50 mass % of 2,3,3,3-tetrafluoropropene (HFO-1234yf).

PTL 3 discloses a refrigerant composition comprising difluoromethane (HFC-32), pentafluoroethane (HFC-125), and 2,3,3,3-tetrafluoropropene (HFO-1234yf), wherein the ratio of HFC-32/HFC-125/HFO-1234yf is in a range surrounded by points (0/21/79 mass %), (16.6/25.3/58.1 mass %), and (0/28.4/71.6 mass %) in a ternary diagram of the refrigerant composition, and the composition essentially comprises HFC-32.

PTL 4 discloses a heat transfer composition comprising (a) from about 20% to about 30% by weight of HFC-32, (b) from about 20% to about 30% by weight of HFC-125, (c) from about 0% to about 15% by weight of HFO-1234yf and from about 10% to about 30% by weight of HFO-1234ze, and (d) from about 15% to about 30% by weight of HFC-134a, with the weight percent being based on the total of the components (a) to (d) in the composition.

Although CFC and HCFC have lubrication performance, the lubrication performance of a composition comprising a mixture of HFC and HFO is lower than those of CFC and/or HCFC. In particular, when such a composition is used as a refrigerant composition, the lubrication performance as a whole is generally ensured by using a lubricating oil (refrigerant oil) in combination. In this respect, it is desirable to improve the lubrication performance of the composition comprising a mixture of HFC and HFO before a lubricating oil is used in combination. This improvement has become an issue.

CITATION LIST

Patent Literature

PTL 1: WO2010/002020 (JP2011-525205A)
PTL 2: WO2011/093521 (JP2013-501820A)
PTL 3: WO2010/002014 (JP2011-525204A)
PTL 4: WO2012/151238 (JP2014-514423A)

SUMMARY OF INVENTION

Technical Problem

An object of the present invention is to provide a composition comprising a mixture of HFC and HFO, and having improved lubrication performance.

Solution to Problem

The present inventor conducted extensive research to achieve the above object, and consequently found that the above object can be achieved by a composition comprising HFC and HFO, and further comprising a specific third component. Thus, the present invention has been completed.

That is, the present invention relates to the following compositions comprising HFC and HFO.

1. A composition comprising HFC and HFO, wherein the composition comprises:
   1) at least one of HFC-134a and HFC-134 as the HFC;
   2) at least one of HFO-1234yf and HFO-1234ze as the HFO; and
   3) at least one member selected from the group consisting of HCFC-1122, HCFC-124, CFC-1113, and 3,3,3-trifluoropropyne as a third component.

2. A composition comprising HFC and HFO, wherein the composition comprises:
   1) HFC-32 as the HFC;
   2) at least one of HFO-1234yf and HFO-1234ze as the HFO; and
   3) at least one member selected from the group consisting of HCC-40, HCFC-22, and 3,3,3-trifluoropropyne as a third component.

3. A composition comprising HFC and HFO, wherein the composition comprises:
   1) HFC-125 as the HFC;
   2) at least one of HFO-1234yf and HFO-1234ze as the HFO; and
   3) at least one of CFC-115 and 3,3,3-trifluoropropyne as a third component.

4. A composition comprising HFCs and HFO, wherein the composition comprises:
   1) HFC-32 and HFC-125 as the HFCs;
   2) at least one of HFO-1234yf and HFO-1234ze as the HFO; and
   3) at least one member selected from the group consisting of HCC-40, HCFC-22, CFC-115, and 3,3,3-trifluoropropyne as a third component.

5. A composition comprising HFC and HFO, wherein the composition comprises:
   1) at least one member selected from the group consisting of HFC-32, HFC-125, HFC-134a, and HFC-134 as the HFC;
   2) at least one of HFO-1234yf and HFO-1234ze as the HFO; and
   3) at least one member selected from the group consisting of HCC-40, HCFC-22, HCFC-124, CFC-115, HCFC-1122, CFC-1113, and 3,3,3-trifluoropropyne as a third component.

6. The composition according to any one of the above items 1 to 5, wherein the total amount of the HFC and the HFO is 95 mass % or more when the total amount of the HFC, the HFO, and the third component is 100 mass %.
7. The composition according to any one of the above items 1 to 6, which is a refrigerant composition.
8. The composition according to any one of the above items 1 to 7, wherein the composition further comprises a refrigerant oil in an amount of 10 to 50 mass % in the composition.
9. The composition according to any one of the above items 2 and 4 to 8, wherein HCC-40 is contained in an amount of 1 mass % or less when the total amount of the HFC, the HFO, and the third component is 100 mass %.

Advantageous Effects of Invention

The compositions of the present invention have improved lubrication performance because they comprise HFC and HFO, and further comprise a specific third component (at least one of specific chlorine-containing substances and 3,3,3-trifluoropropyne, i.e., at least one of HCFC-1122, HCFC-124, CFC-1113, HCC-40, HCFC-22, CFC-115, and 3,3,3-trifluoropropyne). The compositions of the present invention are useful as refrigerant compositions, for example.

BRIEF DESCRIPTION OF DRAWING

The FIGURE is a schematic view of a thrust-type friction and abrasion tester (pin-on-disk type) used in an abrasion test in the Examples and Comparative Examples.

DESCRIPTION OF EMBODIMENTS

The compositions of the present invention comprise HFC and HFO, and further comprise a specific third component (at least one of specific chlorine-containing substances and 3,3,3-trifluoropropyne, i.e., at least one of HCFC-1122, HCFC-124, CFC-1113, HCC-40, HCFC-22, CFC-115, and 3,3,3-trifluoropropyne), and can be classified into the following Embodiments 1 to 5 depending on the combination of HFC, HFO, and third component. The components constituting the composition of the present invention are defined in Table 1.

TABLE 1

| Code | Structure | Chemical Name |
|---|---|---|
| HFC-134a | $CF_3CH_2F$ | 1,1,1,2-tetrafluoroethane |
| HFC-134 | $CF_2HCF_2H$ | 1,1,2,2-tetrafluoroethane |
| HFC-32 | $CH_2F_2$ | Difluoromethane |
| HFC-125 | $C_2HF_5$ | Pentafluoroethane |
| HFO-1234yf | $CF_3CF=CH_2$ | 2,3,3,3-tetrafluoropropene |
| HFO-1234ze | $CF_3CH=CHF$ | E- or Z-1,3,3,3-tetrafluoropropene |
| HCFC-1122 | $CF_2=CHCl$ | 2,2-difluoro-1-chloroethylene |
| HCFC-124 | $CF_3CFClH$ | 1,1,1,2-tetrafluoroethane |
| HCC-40 | $CH_3Cl$ | Chloromethane |
| CFC-1113 | $CF_2=CClF$ | Chlorotrifluoroethylene |
| HCFC-22 | $CHF_2Cl$ | Chlorodifluoromethane |
| CFC-115 | $CF_2ClCF_3$ | Chloropentafluoroethane |
| — | $CF_3C\equiv CH$ | 3,3,3-trifluoropropyne |

Composition of Embodiment 1

The composition of Embodiment 1 comprises HFC and HFO, wherein the composition comprises:

1) at least one of HFC-134a and HFC-134 as the HFC;
2) at least one of HFO-1234yf and HFO-1234ze as the HFO; and
3) at least one member selected from the group consisting of HCFC-1122, HCFC-124, CFC-1113, and 3,3,3-trifluoropropyne as a third component.

Compared with a composition comprising only a combination of HFC and HFO mentioned above, the composition of Embodiment 1 has improved lubrication performance because it comprises, in addition to the combination of HFC and HFO mentioned above, at least one of HCFC-1122, HCFC-124, CFC-1113, and 3,3,3-trifluoropropyne as a third component.

In Embodiment 1, HFO-1234yf and HFO-1234ze may be used singly or mixed at any ratio for use. When. HFO-1234yf and HFO-1234ze are mixed, it is preferable that the HFO-1234yf content is 1 to 99 mass %, and the HFO-1234ze content is 99 to 1 mass %, when the total amount of the HFOs is 100 mass %.

In Embodiment 1, options for the third component preferably include at least three members: HCFC-1122, HCFC-124, and CFC-1113, and may further include 3,3,3-trifluoropropyne. The content of each of these third components is not limited; however, among the third components, the CFC-1113 content is preferably higher.

In Embodiment 1, the total amount of HFC and HFO is preferably 95 mass % or more when the total amount of the HFC, the HFO, and the third component (at least one of HCFC-1122, HCFC-124, CFC-1113, and 3,3,3-trifluoropropyne) is 100 mass %. In other words, the content of the third component is preferably less than 5 mass %. Although the lubrication performance is maintained even when the content of the third component is 5 mass % or more, less than 5 mass % is preferred in order to maintain the properties of the mixture composition of HFC and HFO.

Composition of Embodiment 2

The composition of Embodiment 2 comprises HFC and HFO, wherein the composition comprises:

1) HFC-32 as the HFC;
2) at least one of HFO-1234yf and HFO-1234ze as the HFO; and
3) at least one member selected from the group consisting of HCC-40, HCFC-22, and 3,3,3-trifluoropropyne as a third component.

Compared with a composition comprising only a combination of HFC and HFO mentioned above, the composition of Embodiment 2 has improved lubrication performance because it comprises, in addition to the combination of HFC and HFO mentioned above, at least one of HCC-40, HCFC-22, and 3,3,3-trifluoropropyne as a third component.

In Embodiment 2, HFO-1234yf and HFO-1234ze may be used singly or mixed at any ratio for use. When HFO-1234yf and HFO-1234ze are mixed, it is preferable that the HFO-1234yf content is 1 to 99 mass %, and the HFO-1234ze content is 99 to 1 mass %, when the total amount of the HFOs is 100 mass %.

In Embodiment 2, options for the third component preferably include at least two members: HCC-40 and HCFC-22, and may further include 3,3,3-trifluoropropyne. The content of each of these third components is not limited. When a composition comprising HCC-40 is used as a refrigerant composition, HCC-40 may react with aluminum, which is assumed to be used as a piping material of a refrigerator, and thereby produce an explosive substance. Therefore, when HCC-40 is contained, its content is preferably 1 mass % or less when the total amount of the HFC, the HFO, and the third component (at least one member selected from the group consisting of HCC-40, HCFC-22, and 3,3,3-trifluoropropyne) is 100 mass %.

In Embodiment 2, the total amount of HFC and HFO is preferably 95 mass % or more when the total amount of the HFC, the HFO, and the third component (at least one member selected from the group consisting of HCC-40, HCFC-22, and 3,3,3-trifluoropropyne) is 100 mass %. In other words, the content of the third component is preferably less than 5 mass %. Although the lubrication performance is maintained even when the content of the third component is 5 mass % or more, less than 5 mass % is preferred in order to maintain the properties of the mixture composition of HFC and HFO.

Composition of Embodiment 3

The composition of Embodiment 3 comprises HFC and HFO, wherein the composition comprises:
1) HFC-125 as the HFC;
2) at least one of HFO-1234yf and HFO-1234ze as the HFO; and
3) at least one of CFC-115 and 3,3,3-trifluoropropyne as a third component.

Compared with a composition comprising only a combination of HFC and HFO mentioned above, the composition of Embodiment 3 has improved lubrication performance because it comprises, in addition to the combination of HFC and HFO mentioned above, at least one of CFC-115 and 3,3,3-trifluoropropyne as a third component.

In Embodiment 3, HFO-1234yf and HFO-1234ze may be used singly or mixed at any ratio for use. When HFO-1234yf and HFO-1234ze are mixed, it is preferable that the HFO-1234yf content is 1 to 99 mass %, and the HFO-1234ze content is 99 to 1 mass %, when the total amount of the HFOs is 100 mass %.

In Embodiment 3, options for the third component preferably include at least CFC-115, and may further include 3,3,3-trifluoropropyne. The content of each of these third components is not limited; however, among the third components, the CFC-115 content is preferably higher.

In Embodiment 3, the total amount of HFC and HFO is preferably 95 mass % or more when the total amount of the HFC, the HFO, and the third component (at least one of CFC-115 and 3,3,3-trifluoropropyne) is 100 mass %. In other words, the content of the third component is preferably less than 5 mass %. Although the lubrication performance is maintained even when the content of the third component is 5 mass % or more, less than 5 mass % is preferred in order to maintain the properties of the mixture composition of HFC and HFO.

Composition of Embodiment 4

The composition of Embodiment 4 comprises HFCs and HFO, wherein the composition comprises:
1) HFC-32 and HFC-125 as the HFCs;
2) at least one of HFO-1234yf and HFO-1234ze as the HFO; and
3) at least one member selected from the group consisting of HCC-40, HCFC-22, CFC-115, and 3,3,3-trifluoropropyne as a third component.

Compared with a composition comprising only a combination of HFC and HFO mentioned above, the composition of Embodiment 4 has improved lubrication performance because it comprises, in addition to the combination of HFC and HFO mentioned above, at least one of HCC-40, HCFC-22, CFC-115, and 3,3,3-trifluoropropyne as a third component.

In Embodiment 4, HFO-1234yf and HFO-1234ze may be used singly or mixed at any ratio for use. When HFO-1234yf and HFO-1234ze are mixed, it is preferable that the HFO-1234yf content is 1 to 99 mass %, and the HFO-1234ze content is 99 to 1 mass %, when the total amount of the HFOs is 100 mass %.

In Embodiment 4, options for the third component preferably include at least three members: HCC-40, HCFC-22, and CFC-115, and may further include 3,3,3-trifluoropropyne. The content of each of these third components is not limited; however, among the third components, the CFC-115 content is preferably higher. When a composition comprising HCC-40 is used as a refrigerant composition, HCC-40 may react with aluminum, which is assumed to be used as a piping material of a refrigerator, and thereby produce an explosive substance. Therefore, when HCC-40 is contained, its content is preferably 1 mass % or less when the total amount of the HFC, the HFO, and the third component (at least one member selected from the group consisting of HCC-40, HCFC-22, CFC-115, and 3,3,3-trifluoropropyne) is 100 mass %.

In Embodiment 4, the total amount of HFC and HFO is preferably 95 mass % or more when the total amount of the HFC, the HFO, and the third component (at least one member selected from the group consisting of HCC-40, HCFC-22, CFC-115, and 3,3,3-trifluoropropyne) is 100 mass %. In other words, the content of the third component is preferably less than 5 mass %. Although the lubrication performance is maintained even when the content of the third component is 5 mass % or more, less than 5 mass % is preferred in order to maintain the properties of the mixture composition of HFC and HFO.

Composition of Embodiment 5

The composition of Embodiment 5 comprises HFC and HFO, wherein the composition comprises:
1) at least one member selected from the group consisting of HFC-32, HFC-125, HFC-134a, and HFC-134 as the HFC;
2) at least one of HFO-1234yf and HFO-1234ze as the HFO; and
3) at least one member selected from the group consisting of HCC-40, HCFC-22, HCFC-124, CFC-115, HCFC-1122, CFC-1113, and 3,3,3-trifluoropropyne as a third component.

Compared with a composition comprising only a combination of HFC and HFO mentioned above, the composition of Embodiment 5 has improved lubrication performance because it comprises, in addition to the combination of HFC and HFO mentioned above, at least one of HCC-40, HCFC-22, HCFC-124, CFC-115, HCFC-1122, CFC-1113, and 3,3,3-trifluoropropyne as a third component.

In Embodiment 5, HFO-1234yf and HFO-1234ze may be used singly or mixed at any ratio for use. When HFO-1234yf and HFO-1234ze are mixed, it is preferable that the HFO-1234yf content is 1 to 99 mass %, and the HFO-1234ze content is 99 to 1 mass %, when the total amount of the HFOs is 100 mass %.

In Embodiment 5, options for the third component preferably include at least six members: HCC-40, HCFC-22, HCFC-124, CFC-115, HCFC-1122, and CFC-1113, and may further include 3,3,3-trifluoropropyne. The content of each of these third components is not limited; however, among the third components, the CFC-1113 and CFC-115 contents are preferably higher. When a composition comprising HCC-40 is used as a refrigerant composition, HCC-40 may react with aluminum, which is assumed to be used as a piping material of a refrigerator, and thereby produce an explosive substance. Therefore, when HCC-40 is contained, its content is preferably 1 mass % or less when the total amount of the HFC, the HFO, and the third component (at least one member selected from the group consisting of HCC-40, HCFC-22, HCFC-124, CFC-115, HCFC-1122, CFC-1113, and 3,3,3-trifluoropropyne) is 100 mass %.

In Embodiment 5, the total amount of HFC and HFO is preferably 95 mass % or more when the total amount of the HFC, the HFO, and the third component (at least one member selected from the group consisting of HCC-40, HCFC-22, HCFC-124, CFC-115, HCFC-1122, CFC-1113, and 3,3,3-trifluoropropyne) is 100 mass %. In other words, the content of the third component is preferably less than 5 mass %. Although the lubrication performance is maintained even when the content of the third component is 5 mass % or more, less than 5 mass % is preferred in order to maintain the properties of the mixture composition of HFC and HFO.

Matter Common to Compositions of Embodiments 1 to 5

The compositions of Embodiments 1 to 5 (the compositions of the present invention) have improved lubrication performance because they comprise HFC and HFO, and further comprise a specific third component (at least one of specific chlorine-containing substances and 3,3,3-trifluoropropyne, i.e., at least one of HCFC-1122, HCFC-124, CFC-1113, HCC-40, HCFC-22, CFC-115, and 3,3,3-trifluoropropyne).

The compositions of the present invention can be used for various applications, such as refrigerant compositions, aerosol propellants, foaming agents, blowing agents, solvents, cleaning agents, dispersion media, displacement drying agents, buffing abrasive agents, polymerization media, swelling agents, and fire suppression agents.

Among these applications, the compositions of the present invention can be particularly suitably used as refrigerant compositions because they have improved lubrication performance. For example, the compositions of the present invention can be suitably used in various refrigerators, such as car air conditioners, vending machine refrigerators, commercial and home air conditioners, gas heat pumps (GHPs), and electrical heat pumps (EHPs). When used as a refrigerant composition, the composition of the present invention may further contain a refrigerant oil, if necessary. The refrigerant oil content, when used, is preferably set within the range of 10 to 50 mass % of the refrigerant composition.

EXAMPLES

The present invention is described in detail below with reference to Examples and Comparative Examples. However, the present invention is not limited to these Examples.

In the Examples and the Comparative Examples, the lubrication performance of each composition was evaluated from the results of an abrasion test and a baking test. The methods of the abrasion test and the baking test are as described below.

Abrasion Test

Using a thrust-type friction and abrasion tester (pin-on-disk type: see the FIGURE), abrasion loss was measured by the abrasion test using each composition.

Baking Test

Baking load was measured by the baking test using each composition, in which a rod (shaft material) was pressed to a rotating disk (bearing material) while applying a load. The baking load was evaluated as a relative value when the baking load in the Comparative Example was regarded as 100.

Example 1-1 (Refrigerant Composition of Embodiment 1) and Comparative Example 1-1

The compositions of Example 1-1 and Comparative Example 1-1 were prepared according to the formulations shown in Table 2.

TABLE 2

|  | Example 1-1 | Comparative Example 1-1 |
| --- | --- | --- |
| HFC-134a + HFC134 (60 mass %) HFO-1234yf (39.5 mass %) | 99.5 mass % | 100 mass % |
| HCFC-1122 (0.3 mass %) HCFC-124 (0.1 mass %) CFC-1113 (0.05 mass %) 3,3,3-trifluoropropyne (0.05 mass %) | 0.5 mass % | — |

Table 3 below shows the test results.

TABLE 3

|  | Example 1-1 | Comparative Example 1-1 |
| --- | --- | --- |
| Abrasion test (abrasion loss) | 4.0 μm | 4.3 μm |
| Baking test (load) | 107 | 100 |

The results of Table 3 revealed that the lubrication performance was improved by adding a third component.

Examples 1-2 to 1-4 (Refrigerant Composition of Embodiment 1)

The compositions of Examples 1-2 to 1-4 were prepared according to the formulations shown in Table A.

TABLE A

|  | Example 1-2 | Example 1-3 | Example 1-4 |
| --- | --- | --- | --- |
| HFC-134a + HFC134 (60 mass %) HFO-1234yf (39.5 mass %) | 99.5 mass % | 99.5 mass % | 99.5 mass % |
| HCFC-1122 | 0.5 mass % | 0.3 mass % | 0.3 mass % |
| HCFC-124 | — | 0.2 mass % | 0.1 mass % |
| CFC-1113 | — | — | 0.1 mass % |
| Total | 100 mass % | 100 mass % | 100 mass % |

Table B below shows the test results.

TABLE B

|  | Example 1-2 | Example 1-3 | Example 1-4 |
| --- | --- | --- | --- |
| Abrasion test (abrasion loss) | 4.0 μm | 4.0 μm | 4.0 μm |
| Baking test (load) | 107 | 107 | 107 |

The results of Table B revealed that the lubrication performance was improved by adding a third component.

Example 1-5 (Refrigerant Composition of Embodiment 1) and Comparative Example 1-2

The compositions of Example 1-5 and Comparative Example 1-2 were prepared according to the formulations shown in Table C.

TABLE C

|  | Example 1-5 | Comparative Example 1-2 |
| --- | --- | --- |
| HFC-134a + HFC134 (60 mass %) HFO-1234ze (39.5 mass %) | 99.5 mass % | 100 mass % |
| HCFC-1122 (0.3 mass %) HCFC-124 (0.1 mass %) CFC-1113 (0.05 mass %) 3,3,3-trifluoropropyne (0.05 mass %) | 0.5 mass % | — |
| Total | 100 mass % | 100 mass % |

Table D below shows the test results.

TABLE D

|  | Example 1-5 | Comparative Example 1-2 |
| --- | --- | --- |
| Abrasion test (abrasion loss) | 4.2 μm | 4.5 μm |
| Baking test (load) | 106 | 100 |

The results of Table D revealed that the lubrication performance was improved by adding a third component.

Example 2 (Refrigerant Composition of Embodiment 2) and Comparative Example 2

The compositions of Example 2 and Comparative Example 2 were prepared according to the formulations shown in Table 4.

TABLE 4

|  | Example 2 | Comparative Example 2 |
| --- | --- | --- |
| HFC-32 (69.5 mass %) HFO-1234yf (30 mass %) | 99.5 mass % | 100 mass % |
| HCC-40 (0.25 mass %) HCFC-22 (0.2 mass %) 3,3,3-trifluoropropyne (0.05 mass %) | 0.5 mass % | — |

Table 5 below shows the test results.

TABLE 5

|  | Example 2 | Comparative Example 2 |
| --- | --- | --- |
| Abrasion test (abrasion loss) | 4.1 μm | 4.4 μm |
| Baking test (load) | 106 | 100 |

The results of Table 5 revealed that the lubrication performance was improved by adding a third component.

Example 3 (Refrigerant Composition of Embodiment 3) and Comparative Example 3

The compositions of Example 3 and Comparative Example 3 were prepared according to the formulations shown in Table 6.

TABLE 6

|  | Example 3 | Comparative Example 3 |
| --- | --- | --- |
| HFC-125 (60 mass %) HFO-1234yf (39.5 mass %) | 99.5 mass % | 100 mass % |
| CFC-115 (100 mass %) | 0.5 mass % | — |

Table 7 below shows the test results.

TABLE 7

|  | Example 3 | Comparative Example 3 |
| --- | --- | --- |
| Abrasion test (abrasion loss) | 3.9 μm | 4.3 μm |
| Baking test (load) | 107 | 100 |

The results of Table 7 revealed that the lubrication performance was improved by adding a third component.

Example 4 (Refrigerant Composition of Embodiment 4) and Comparative Example 4

The compositions of Example 4 and Comparative Example 4 were prepared according to the formulations shown in Table 8.

TABLE 8

|  | Example 4 | Comparative Example 4 |
| --- | --- | --- |
| HFC-32 (30 mass %) HFC-125 (30 mass %) HFO-1234ze (39.5 mass %) | 99.5 mass % | 100 mass % |
| HCC-40 (0.1 mass %) HCFC-22 (0.1 mass %) CFC-115 (0.4 mass %) | 0.5 mass % | — |

Table 9 below shows the test results.

TABLE 9

|  | Example 4 | Comparative Example 4 |
| --- | --- | --- |
| Abrasion test (abrasion loss) | 4.0 μm | 4.3 μm |
| Baking test (load) | 107 | 100 |

The results of Table 9 revealed that the lubrication performance was improved by adding a third component.

Example 5 (Refrigerant Composition of Embodiment 5) and Comparative Example 5

The compositions of Example 5 and Comparative Example 5 were prepared according to the formulations shown in Table 10.

TABLE 10

|  | Example 5 | Comparative Example 5 |
| --- | --- | --- |
| HFC-32 (25 mass %) HFC-125 (25 mass %) HFC-134a + HFC-134 (10 mass %) HFO-1234ze (39.5 mass %) | 99.5 mass % | 100 mass % |
| HCC-40 (0.05 mass %) HCFC-1122 (0.05 mass %) | 0.5 mass % | — |

TABLE 10-continued

|  | Example 5 | Comparative Example 5 |
|---|---|---|
| HCFC-22 (0.05 mass %) | | |
| HCFC-124 (0.05 mass %) | | |
| CFC-1113 (0.05 mass %) | | |
| CFC-115 (0.25 mass %) | | |

Table 11 below shows the test results.

TABLE 11

|  | Example 5 | Comparative Example 5 |
|---|---|---|
| Abrasion test (abrasion loss) | 4.0 μm | 4.3 μm |
| Baking test (load) | 107 | 100 |

The results of Table 11 revealed that the lubrication performance was improved by adding a third component.

The invention claimed is:

1. A composition comprising HFC and HFO, wherein the composition comprises:
   1) at least one of HFC-134a and HFC-134 as the HFC;
   2) at least one of HFO-1234yf and HFO-1234ze as the HFO; and
   3) a third component comprising HCFC-1122.

2. The composition according to claim 1, wherein a total amount of the HFC and the HFO is 95 mass % or more when a total amount of the HFC, the HFO, and the third component is 100 mass %.

3. The composition according to claim 1, which is a refrigerant composition.

4. The composition according to claim 1, wherein the composition further comprises a refrigerant oil in an amount of 10 to 50 mass % in the composition.

5. The composition according to claim 1, wherein the third component further comprises at least one member selected from the group consisting of HCFC-124, CFC-1113 and 3,3,3-trifluoropropyne.

* * * * *